Aug. 23, 1938.　　W. A. REICHEL ET AL　　2,127,831
CENTRIFUGAL ELECTRIC TACHOMETER
Filed Feb. 4, 1937　　2 Sheets-Sheet 1
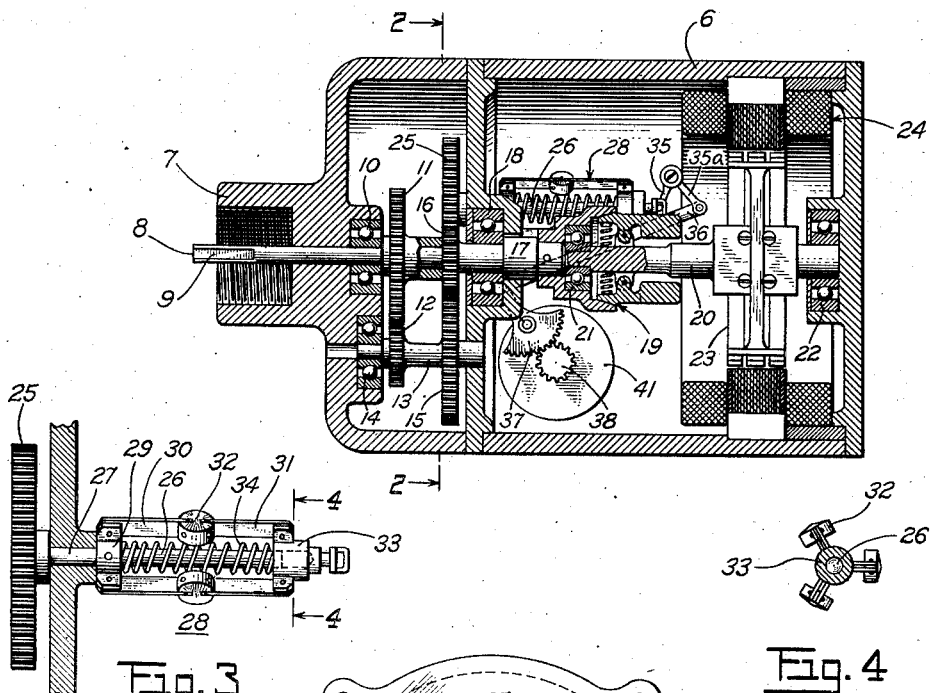
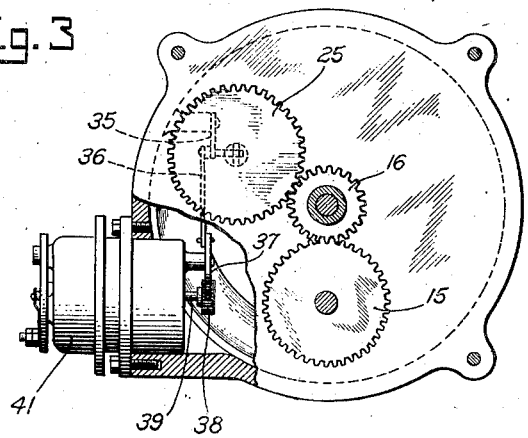
INVENTORS.
Wladimir A. Reichel.
Morris F. Ketay.
BY Stephen Cerstvik
ATTORNEY.

Aug. 23, 1938.   W. A. REICHEL ET AL   2,127,831
CENTRIFUGAL ELECTRIC TACHOMETER
Filed Feb. 4, 1937   2 Sheets-Sheet 2

Wladimir A. Reichel
Morris F. Ketay.
INVENTORS.

BY Stephen Cerstvik
ATTORNEY.

Patented Aug. 23, 1938

2,127,831

UNITED STATES PATENT OFFICE 2,127,831

CENTRIFUGAL ELECTRIC TACHOMETER

Wladimir A. Reichel, Bellerose, and Morris F. Ketay, Brooklyn, N. Y., assignors to Bendix Aviation Corporation, South Bend, Ind., a corporation of Delaware Application February 4, 1937, Serial No. 124,150

6 Claims. (Cl. 175—183)

The present invention relates to remotely indicating tachometers and more particularly to a tachometer in which a centrifugal type speed-responsive device actuates the movable field of a self-synchronous motor transmitter, whereby the speed indication is transmitted to an indicating device embodying a self-synchronous motor receiver.

The invention embodies a housing adapted to be connected to an engine, whereby the engine drive shaft drives a centrifugal type speed-responsive device to move the field of the self-synchronous motor transmitter, simultaneously rotating an alternator through a speed-responsive clutch mechanism, whereby the alternator is released at speeds above a certain maximum, thereby maintaining said alternator at constant speed, to supply a current of constant voltage and frequency to energize the field of the self-synchronous motor transmitter and the field of the remote self-synchronous motor indicator.

More specifically, the device embodying the invention is provided for the purpose of accurately indicating speed at a remote point, wherein the apparatus will not be affected by temperature changes in electrical elements or by back-lash and other defects in mechanical connecting devices.

Similar devices of the prior art have been used which were purely electrical and the frequency of an electrical generating device was used to indicate speed, but such devices have been subject to inaccuracies due to temperature changes which change the electrical properties of the device. Mechanical devices have also been used heretofore for indicating speed, but such devices have also been subject to inaccuracies whenever remote indications were desired because of back-lash in the torque connections, and other mechanical defects.

Accordingly, one of the objects of the present invention is to provide a novel, remote speed-indicating device which is free of electrical and mechanical faults and inaccuracies.

Another object is to provide a novel, remote speed-indicating device wherein voltage and frequency changes are eliminated.

Still another object is to provide a novel, remote speed-indicating device wherein back-lash and other sources of error in indication are eliminated.

A further object is to provide a novel, remote speed-indicating device of the "Selsyn" or "Autosyn" type, wherein a constant voltage and frequency generator is clutch-driven by the same means that actuates the moving field of the self-synchronous transmitter motor.

A still further object is to provide a speed-indicating device wherein means, motivated in proportion to the speed to be indicated, control the field of a self-synchronous transmitter motor, whereby changes in speed actuate the field of a remote self-synchronous receiver motor in synchronism with the movement of the first field to operate indicating means for indicating the desired speed.

Still another object is to provide a novel, remote speed-indicating device wherein a speed-responsive clutch is driven by the apparatus whose speed is to be indicated, said clutch maintaining an alternator at constant speed, said apparatus controlling the position of the field of a self-synchronous transmitter motor which is energized by the constant speed alternator, whereby voltage and frequency are maintained constant, said self-synchronous transmitter motor being connected to remote self-synchronous receiver motors which operate as indicating devices, whereby an accurate speed indication at one or more remote points is obtained.

The above and other objects and advantages of the invention will appear more fully hereinafter from a consideration of the detailed description which follows, taken together with the accompanying drawings wherein is illustrated one embodiment of the invention. It is to be expressly understood, however, that the drawings are for the purpose of illustration and description only, and are not designed as a definition of the limits of the invention, reference being had for this purpose to the appended claims.

In the drawings, wherein like reference characters refer to like parts throughout the several views;

Fig. 1 is a transverse sectional view of the apparatus exclusive of the remote indicating device;

Fig. 2 is a section taken on the line 2—2 of Fig. 1;

Fig. 3 is a detailed view of the centrifugal speed-responsive device;

Fig. 4 is a section taken on line 4—4 of Fig. 3; and

Figure 5:
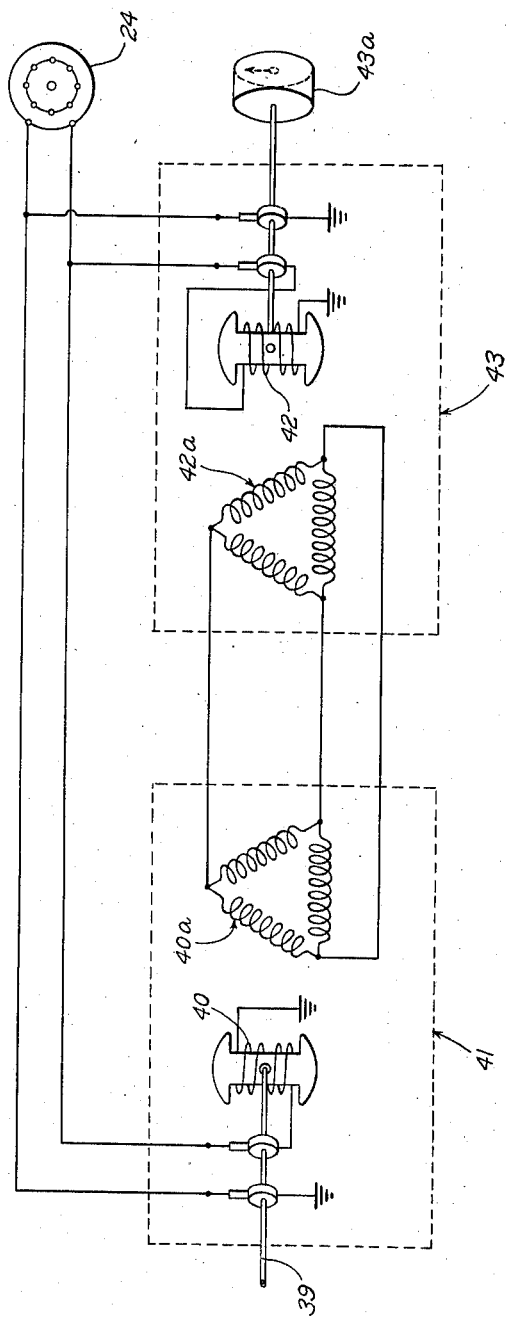
Fig. 5 is a schematic diagram showing the electrical connections between the alternator, transmitter, and the remote tachometer indicator.

Referring to the drawings, and more particularly to Fig. 1, 6 indicates a housing which is provided with a suitable fastening such as an internally threaded tubular extension 7, whereby it can be coupled to the engine whose speed is to be indicated. The drive shaft of said engine is adapted to be connected to the transmitter shaft 8 by means of a double D connection 9 when the housing 6 is screwed into place. Said transmitter shaft 8 is journaled in bearing 10 and carries thereon a gear 11 which meshes with gear 12 on countershaft 13 journaled in bearing 14. Mounted on said countershaft 13 and driven thereby is gear 15 meshing with gear 16 which is mounted on shaft 17 journaled in bearing 18 and driving clutch means 19, whereby shaft 20, journaled in bearings 21 and 22, is driven to rotate rotor 23 of an inductor alternator 24. Gear 16 also meshes with gear 25 on shaft 26 journaled at 27 to drive a centrifugal speed-responsive means 28 mounted on said shaft 26.

Referring to Figs. 3 and 4, said centrifugal speed-responsive means 28 is shown as comprising collar 29, fastened to shaft 26 and rotating therewith, and jointed linkages 30, 31 with weights 32 mounted thereon, whereby when shaft 26 is rotated, weights 32 move outwardly, thereby actuating collar 33 through linkage 31 and moving said collar against spring 34.

Means are now provided whereby the longitudinal movement of collar 33 is converted into angular movement, and means whereby the angular movement is transmitted electrically to a remote point. For this purpose, collar 33 is mounted for movement on shaft 26 and transmits its motion through links 35, 35a and 36, to sector 37, to actuate a gear 38 on shaft 39 which rotates the field 40 (see Fig. 5) of a self-synchronous motor transmitter 41, which motor, in the present embodiment, is of the "Autosyn" type.

Motors of the "Autosyn" type comprise a polyphase armature winding with a single phase field winding in inductive relation, the two windings being relatively rotatable. In the present embodiment, the single phase field winding is shown to be rotatable and the three-phase armature winding is stationary, i. e. the field 40 is the rotatable element which is in inductive relation with a three phase stator winding 40a (Fig. 5). The stator winding 40a is connected to the stator winding 42a of a similar motor located at the remote point and the rotor winding 40 is connected to the rotor winding 42 of the remote motor, said rotor windings being connected in parallel to the alternator 24 so that voltages are induced in their respective stator windings 40a and 42a. These voltages normally counterbalance, but upon angular movement of the rotor winding 40 by the centrifugal device 28, the voltages become unbalanced. The result is a flow of equalizing currents in the mutually connected three phase stator windings, which currents exert a torque on the rotor 42 of the remote motor causing it to reproduce the angular movement of the rotor 40.

The operation of the speed indicating device disclosed herein is as follows: Shaft 8 is driven at the same speed as the shaft of the engine, the speed of which is to be indicated, due to its connection thereto by the coupling means 9. The rotation of said shaft 8 rotates gears 11, 12, 15, 16, shaft 17, and centrifugal clutch means 19. Said clutch means are so designed that above a certain speed the shafts 20 and 17 are disengaged until the rotor 23 slows down to the speed desired, when clutch 19 again connects shafts 20 and 17. The rotor is thus rotated at constant speed, whereby alternator 24 supplies a current of constant voltage and frequency to the fields of the self-synchronous transmitter motor and the remote self-synchronous receiver motor which constitutes the tachometer indicator, said alternator being connected to the fields as shown in Fig. 5.

The gear 16 also meshes with gear 25, thereby rotating shaft 26 to rotate the centrifugal speed-responsive means 28. As the speed changes, said speed-responsive means 28 moves its collar 33 longitudinally along the shaft 26. This movement is converted into angular movement of the shaft 39 of a self-synchronous transmitter motor 41 by the linkages and sector, and the field 40 of device 41 (see Fig. 5) is therefore moved angularly in accordance with the changes in speed. The angular movement of said field changes the electrical relations between said rotatable field and its associated stator in the manner described above. Such change of electrical relations causes angular movement of the field 42 of a remote self-synchronous receiver motor 43 and the indicating means 43a attached thereto to indicate speed. Hence, the speed of the engine whose speed is desired to be known, is indicated at a remote place by the indicator 43a. The use of self-synchronous motors of the type shown, instead of voltage and frequency generating devices driven by the engine whose speed is to be indicated, as in electrical tachometers, eliminates errors due to changes in temperature or due to other elements changing the electrical characteristics of the apparatus. Also, by the use of such self-synchronous motors to replace the link mechanism used with straight mechanical types of remote indicating tachometers, errors due to back-lash are eliminated. The constant speed alternator eliminates any errors that might arise from changes in the electrical source.

There is thus provided a novel remote speed-indicating device, wherein the errors inherent in straight electrical or mechanical type tachometers are eliminated.

Although only one embodiment of the invention has been illustrated and described, various changes and modifications in form, materials, and relative arrangement of parts, which will now appear to those skilled in the art, may be made without departing from the scope of the invention. Reference is therefore to be had to the appended claims for definition of the limits of the invention.

What is claimed is:

1. In a speed indicating device, centrifugal means including a shaft rotated in proportion to the speed to be indicated, a self-synchronous motor having a rotor and a stator, means actuated by said centrifugal means for rotating said rotor, a second and remote self-synchronous motor also having a stator and rotor, said rotors and stators being respectively connected together, a source of alternating current for energizing one of the elements of each of said two self-synchronous motors whereby upon rotation of the first rotor, current is caused to flow in the stators to produce a torque on the second rotor for rotating the latter an amount corresponding to that of the first rotor, and indicating means actuated by the second rotor, said source comprising an alternating current generator driven by the same shaft as the centrifugal means.

2. In a speed-indicating device, a detachable housing, means within said housing motivated in proportion to the speed to be indicated, centrifugal speed-responsive means, a self-synchronous system including two pairs of fields and armatures, an alternator for supplying energy to said fields, means for operating said alternator at constant speed, said centrifugal means connecting said first means and one field of the self-synchronous system, said constant speed operating means connecting said first means and said alternator, and indicating means connected to the other of said fields.

3. In a speed indicating device, means motivated in proportion to the speed to be measured, a self-synchronous system including two pairs of fields and armatures, each of said fields and armatures being movable with respect to each other, an alternator supplying energy to said fields, means for rotating said alternator at constant speed, said first means controlling the relative movement of one field and armature and the rotating means, and indicating means responsive to the relative movement of said other field and armature.

4. In combination with an engine, the speed of rotation of whose shaft is to be indicated, a detachable housing, speed indicating means within said housing comprising centrifugal means motivated in proportion to the speed to be indicated, means for automatically connecting said shaft to said speed indicating means upon connection of said housing to said engine, self-synchronous means, comprising a relatively movable field and armature, an alternator supplying energy to said field, means maintaining said alternator at constant speed, said automatic connecting means controlling both said centrifugal means and said constant speed means, said centrifugal means controlling the movement of said field.

5. A detachable housing, a speed indicating device within said housing, comprising means motivated in proportion to the speed to be indicated, alternator means, a transmitter of a self-synchronous device including a relatively movable field and armature, said alternator supplying the energy to the field of said self-synchronous device, means for maintaining the speed of said alternator constant, means for moving said field relative to its armature, said first means controlling said speed maintaining means and said moving means.

6. A speed indicating device comprising centrifugal means motivated in proportion to the speed to be indicated, self-synchronous means comprising a relatively movable field and armature, an alternator supplying energy to said field, means maintaining said alternator at constant speed, said centrifugal means controlling the movement of said field, and means for connecting said device to an engine, said last means controlling both said centrifugal means and said constant speed means.

WLADIMIR A. REICHEL.
MORRIS F. KETAY.